United States Patent
Kumawat et al.

(10) Patent No.: US 11,200,559 B2
(45) Date of Patent: Dec. 14, 2021

(54) METHOD AND SYSTEM FOR AUTHORIZATION OF TRANSACTIONS

(71) Applicant: MASTERCARD INTERNATIONAL INCORPORATED, Purchase, NY (US)

(72) Inventors: Jaipal Singh Kumawat, Sikar (IN); Ankur Arora, New Delhi (IN); Manjeet Singh, Najibabad (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 110 days.

(21) Appl. No.: 16/166,914

(22) Filed: Oct. 22, 2018

(65) Prior Publication Data
US 2019/0122203 A1 Apr. 25, 2019

(30) Foreign Application Priority Data
Oct. 23, 2017 (SG) .......................... 10201708686X

(51) Int. Cl.
*G06Q 40/00* (2012.01)
*G06Q 20/32* (2012.01)
(Continued)

(52) U.S. Cl.
CPC ....... *G06Q 20/3276* (2013.01); *G06Q 20/322* (2013.01); *G06Q 20/382* (2013.01);
(Continued)

(58) Field of Classification Search
CPC ............. G06Q 20/3276; G06Q 20/401; G06Q 20/3274; G06Q 20/3674; G06Q 20/326; G06Q 10/0633; G06Q 40/00
See application file for complete search history.

(56) References Cited

U.S. PATENT DOCUMENTS

| 9,300,658 B1 * | 3/2016 | Sadacharam | G06F 21/36 |
| 2003/0070073 A1 * | 4/2003 | Miyano | G06K 19/16 |
| | | | 713/168 |

(Continued)

OTHER PUBLICATIONS

"Microchip implant (human)", Retrieved from: https://en.wikipedia.org/wiki/Microchip_implant_(human), Oct. 9, 2017, 8 pages.
(Continued)

*Primary Examiner* — Mike Anderson
(74) *Attorney, Agent, or Firm* — Talem IP Law, LLP

(57) ABSTRACT

A method for transaction authorization includes generation of a master authentication code based on an authorization request for a transaction by a server. The transaction is initiated by a user by way of a transaction application installed on a user-computing device. The server splits the master authentication code into a first authentication code and a second authentication code. The first authentication code is communicated to the transaction application and the second authentication code is communicated to the user by the server. The transaction application generates a response code based on the first authentication code and the second authentication code. The server receives the response code from the transaction application and processes the transaction based on a match between the response code and the master authentication code.

19 Claims, 12 Drawing Sheets

(51) Int. Cl.
*G06Q 20/38* (2012.01)
*G06Q 20/40* (2012.01)

(52) U.S. Cl.
CPC ..... *G06Q 20/3821* (2013.01); *G06Q 20/4014* (2013.01); *G06Q 20/4097* (2013.01)

(56) References Cited

U.S. PATENT DOCUMENTS

| | | | | |
|---|---|---|---|---|
| 2008/0072304 | A1* | 3/2008 | Jennings | H04L 63/123 726/11 |
| 2013/0019096 | A1* | 1/2013 | Palzer | H04L 9/321 713/168 |
| 2014/0040617 | A1* | 2/2014 | Fernandez de Torres | H04L 9/3215 713/168 |
| 2015/0372811 | A1* | 12/2015 | Le Saint | H04L 9/3228 705/76 |

OTHER PUBLICATIONS

Taylor, Lee, "What Are the Different Sections in a QR Code?", Retrieved from: http://qrcode.meetheed.com/question14.php, Feb. 2017, 3 pages.

Lim, Steven, "I Put a Payment Chip in My Hand to Replace My Wallet, Retrieved from: https://www.buzzfeed.com/stevenlim/i-ditched-my-wallet-and-ended-up-with-a-chip-implanted-in-my?utm_term=.qhQG1rxv9Z#.tuDJwWqryb", May 21, 2016, 5 pages.

\* cited by examiner

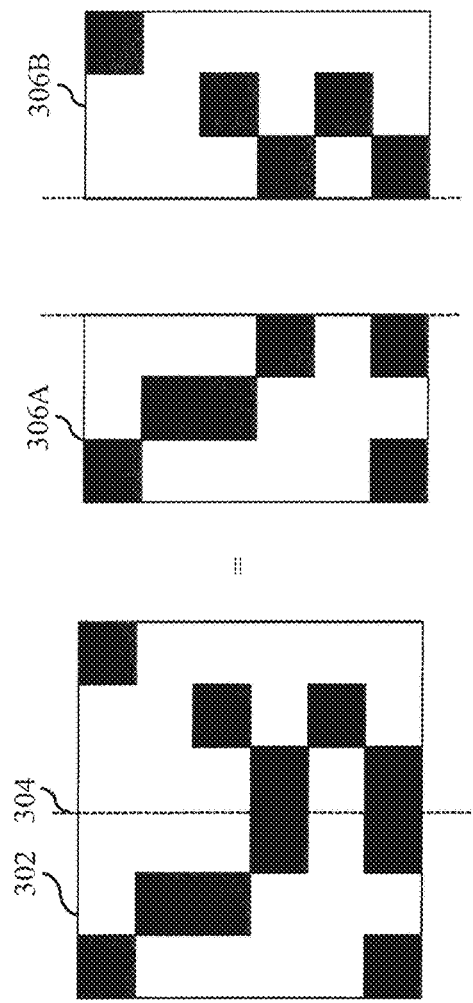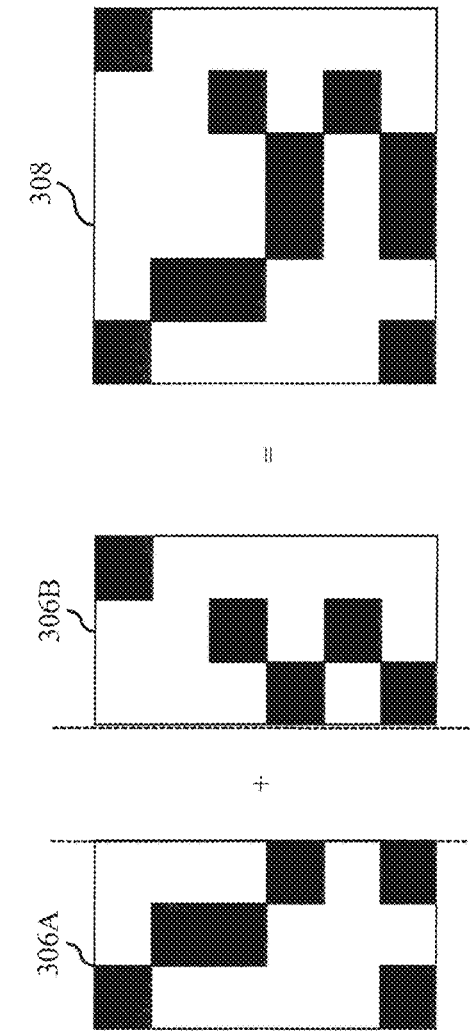
FIG. 3A
FIG. 3B

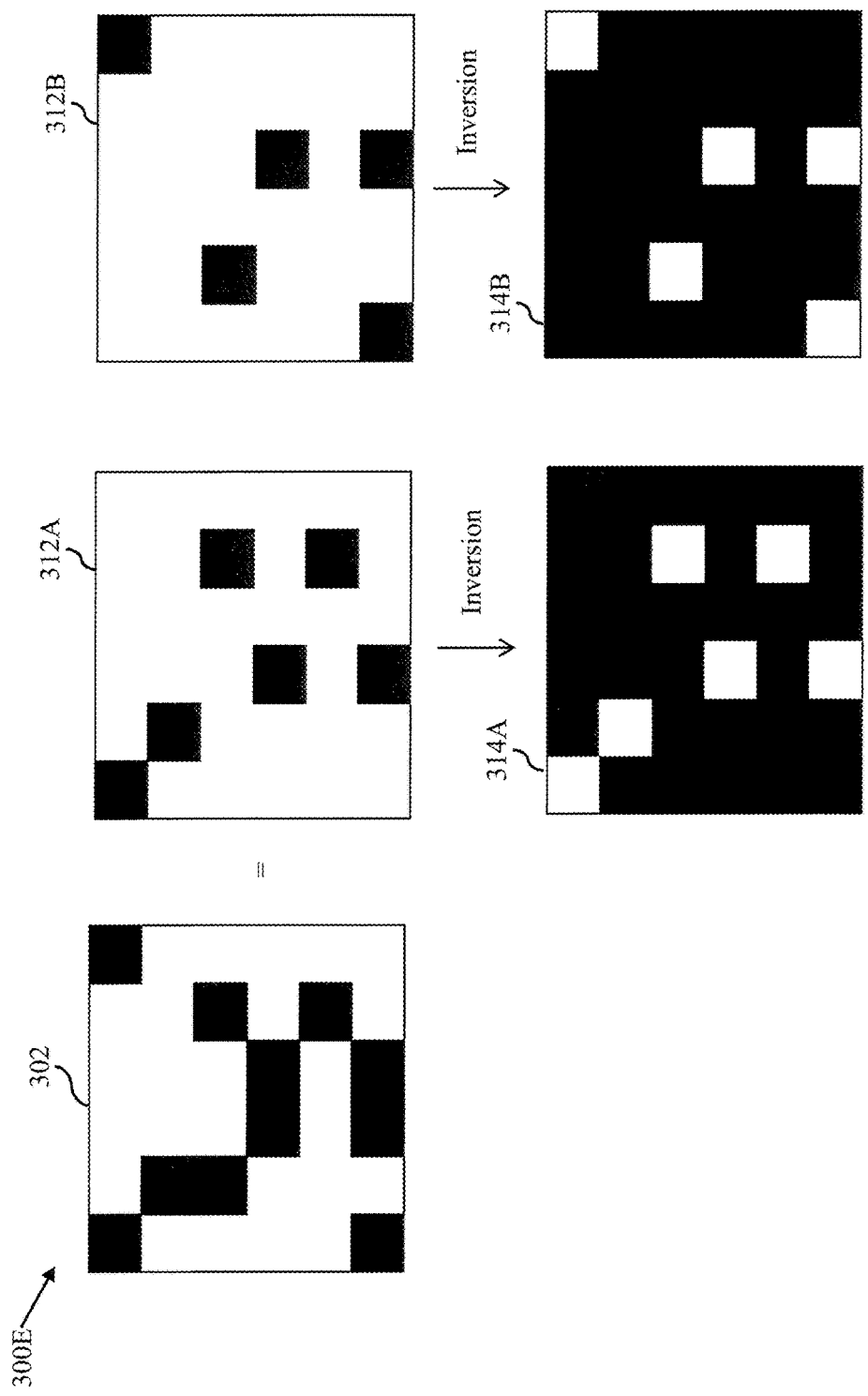

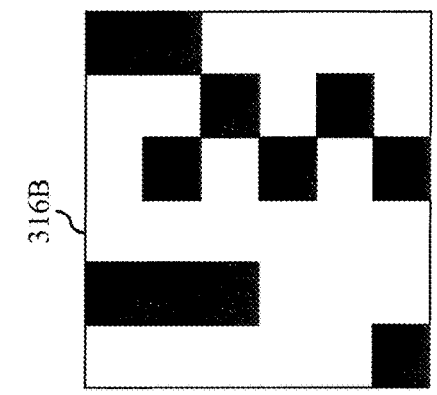
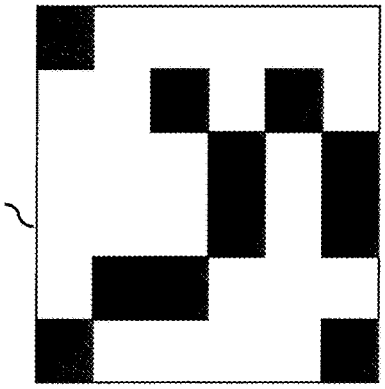
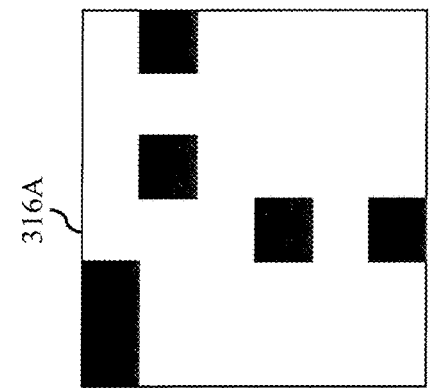
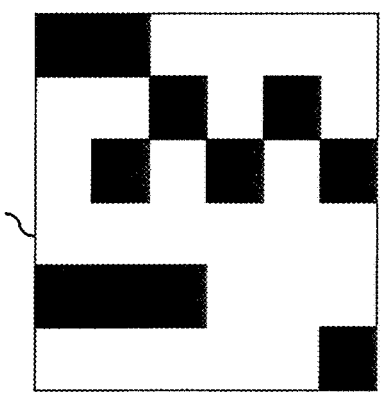
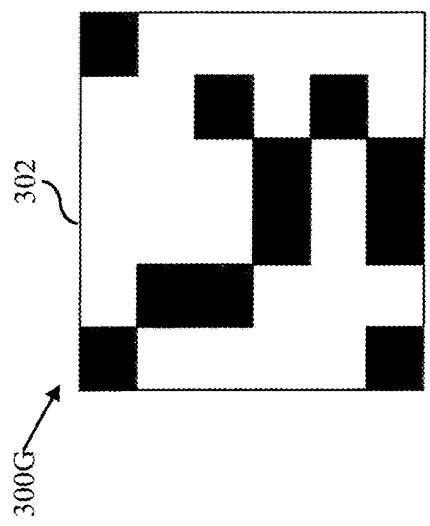
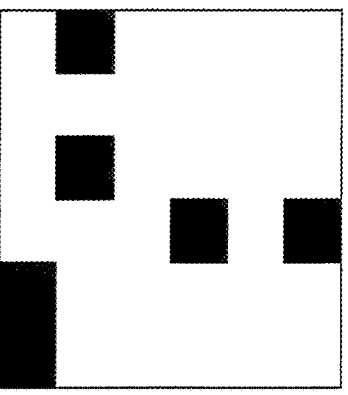
FIG. 3G
FIG. 3H

METHOD AND SYSTEM FOR AUTHORIZATION OF TRANSACTIONS

FIELD OF THE INVENTION

The present invention relates to a method and system for conducting secure transactions, and more particularly to a method and system for authorization to conduct secure transactions by using various transaction applications.

BACKGROUND

Technological advancements have led to emergence and evolution of several payment platforms that enable users to perform cashless transactions, such as deposits and withdrawals, credit transfers, purchase payments, and the like. These payment platforms facilitate various transaction applications to be installed on users' computing devices, such as mobile phones. For performing transactions, users provide their account identification information, such as an account number, a transaction card number, and the like, to these transaction applications. Typically, the transaction applications are third party applications, i.e., they do not necessarily belong to the payment platform provider, and hence the transactions performed by using these transaction applications may not be secure. Therefore, financial institutions, such as banks, authenticate each transaction before authorizing it.

Generally, the banks make use of one-time-passwords (OTPs) for authenticating the transactions. In such implementation, an OTP is communicated to a user by way of registered contact information, such as a registered mobile number or a registered email ID, of the user. The user then submits the OTP to a transaction application, installed on his or her computing device, using which he or she had initiated the transaction. The transaction application then communicates the OTP to the bank and the bank authorizes the transaction when the OTP received from the transaction application matches the OTP communicated to the user.

Authentication methods based on OTPs generally rely on an assumption that the user submits the OTP only to the transaction application using which he or she had initiated the transaction. However, these days the transaction applications that are installed on users' computing devices have access to the user's personal data, such as contact information, message repository, and the like, that is stored in the computing devices. In a scenario, when the computing device of the user is linked to the registered contact information of the user, the OTP is received by the computing device. Hence, most of the transaction applications that are installed on the computing device have access to the OTP. For example, the user may have initiated the transaction by using a first transaction application. However, a second transaction application installed on the computing device may retrieve the OTP by accessing the message repository of the computing device and may use it for performing a fraudulent transaction. Hence, the security of the transaction is compromised. Thus, the current OTP based authentication methods are not the most secure methods for conducting the transactions.

In light of the foregoing, there exists a need for a technical solution that guarantees secure transactions and prevents authorization of a transaction in an event of unauthorized access to an OTP by a transaction application.

SUMMARY

In an embodiment of the present invention, a transaction authorization method is provided. A user initiates a transaction from an account by using a transaction application installed on a user-computing device. A server, such as an issuer server, generates a master authentication code based on an authorization request for the transaction. The server splits the master authentication code into a first authentication code and a second authentication code. The server communicates the first authentication code to the transaction application and the second authentication code to the user by way of registered contact information linked to the account. The transaction application generates the response code based on the first authentication code and the second authentication code. The server receives a response code from the transaction application and processes the transaction based on a match between the response code and the master authentication code.

In another embodiment of the present invention, a transaction authorization system is provided. The transaction authorization system includes a server, such as an issuer server, that further includes a memory and a processor, such as an authorization processor, that communicates with the memory. The memory is configured to store a plurality of authorization requests for a plurality of transactions. A user initiates a transaction from an account by using a transaction application installed on a user-computing device. The processor generates a master authentication code based on an authorization request for the transaction of the plurality of transactions. The processor splits the master authentication code into a first authentication code and a second authentication code. The processor communicates the first authentication code to the transaction application and the second authentication code to the user by way of registered contact information linked to the account. The transaction application generates the response code based on the first authentication code and the second authentication code. The processor receives a response code from the transaction application and processes the transaction based on a match between the response code and the master authentication code.

In yet another embodiment, a method for conducting transactions is provided. A user initiates a transaction from an account by using a transaction application installed on a user-computing device. The transaction application transmits an authorization request for the transaction to a server, such as an issuer server. The server generates a master authentication code based on the authorization request. The server splits the master authentication code into a first authentication code and a second authentication code. The transaction application receives the first authentication code from the server. The server communicates the second authentication code to the user by way of registered contact information linked to the account. The transaction application receives the second authentication code from the user. The transaction application generates a response code based on the first authentication code and the second authentication code. Further, the transaction application transmits the response code to the server for processing the transaction. The server processes the transaction based on a match between the response code and the master authentication code.

BRIEF DESCRIPTION OF THE DRAWINGS

The accompanying drawings illustrate various embodiments of systems, methods, and other aspects of the invention. It will be apparent to a person skilled in the art that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa.

Various embodiments of the present invention are illustrated by way of example, and not limited by the appended figures, in which like references indicate similar elements, and in which:

FIGS. 3A-3H are exemplary scenarios that illustrate splitting of a master authentication code into first and second authentication codes, and generation of a response code based on the first and second authentication codes, in accordance with various embodiments of the present invention;

Figure 1:
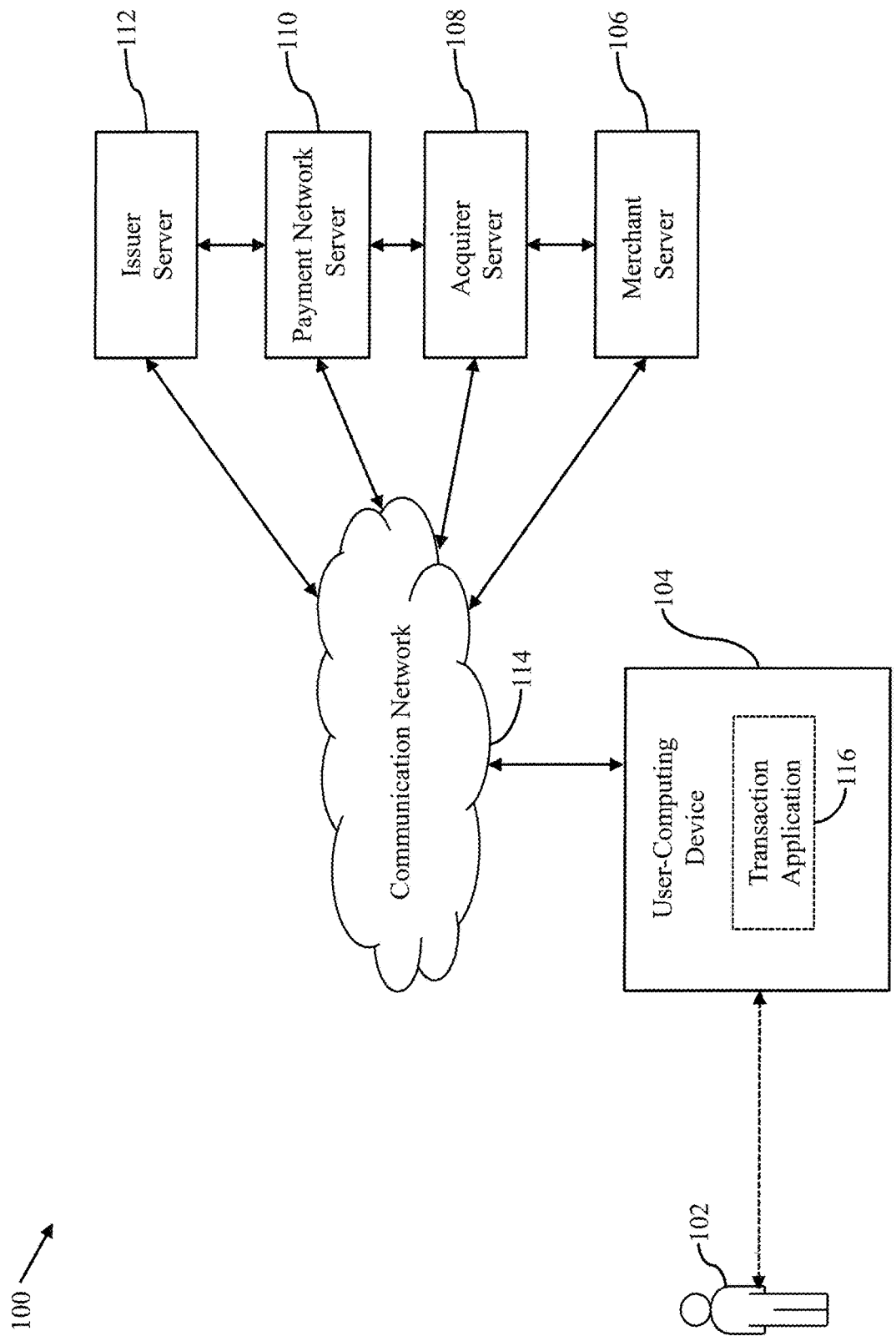
FIG. 1 is a block diagram that illustrates a communication environment for conducting secure transactions, in accordance with an embodiment of the present invention.

Further areas of applicability of the present invention will become apparent from the detailed description provided hereinafter. It should be understood that the detailed description of exemplary embodiments is intended for illustration purposes only and is, therefore, not intended to necessarily limit the scope of the present invention.

DETAILED DESCRIPTION

The present invention is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. In one example, the teachings presented and the needs of a particular application may yield multiple alternate and suitable approaches to implement the functionality of any detail described herein. Therefore, any approach may extend beyond the particular implementation choices in the following embodiments that are described and shown.

References to "an embodiment", "another embodiment", "yet another embodiment", "one example", "another example", "yet another example", "for example" and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Overview

Various embodiments of the present invention provide a method and system for transaction authorization to conduct secure transactions. A user initiates a transaction from an account by using a transaction application installed on a user-computing device. The transaction application transmits an authorization request to a server, such as an issuer server, associated with an issuer bank for authorizing the transaction. The authorization request includes transaction details such as transaction amount, a transaction identification number, time and date of the transaction, a card type, account identification information of the account from which the user initiated the transaction, and the like. The account identification information may include an account number, a unique card number, an expiry date, name of an account holder, a card security code, and the like. The server receives the authorization request and generates a master authentication code based on the authorization request. The master authentication code is a QR Code (a registered trademark of Denso Wave Incorporated, which is a type of matrix barcode). The server splits the master authentication code into first and second authentication codes. The server further communicates the first authentication code to the transaction application and the second authentication code to the user by way of registered contact information linked to the account. For example, the registered contact information may include a registered contact number of the user and a registered email address of the user that are linked to the account. In one scenario, the user submits the second authentication code to the transaction application. In another scenario, the transaction application retrieves the second authentication code from a message repository of the user-computing device. The transaction application merges the first authentication code with the second authentication code to generate a response code. The transaction application transmits the response code to the server for processing the transaction. The server receives the response code and compares it with the master authentication code. When the response code matches the master authentication code, the server approves and processes the transaction. Conversely, when the response code does not match the master authentication code, the server declines the transaction. The server transmits an authorization response message to the transaction application to indicate a status of the transaction authorization. Since both the first and second authentication codes are required to generate the response code, no other transaction application, except the transaction application that receives the first authentication code from the server, can generate the response code that matches the master authentication code. As the server authorizes the transaction only when the response code matches the master authentication code, the transaction is secure.

Terms Description (in Addition to Plain and Dictionary Meaning)

Server is a physical or cloud data processing system on which a server program runs. A server may be implemented in hardware or software, or a combination thereof. In one embodiment, the server is implemented as a computer program that is executed on programmable computers, such as personal computers, laptops, or a network of computer systems. The server may correspond to a merchant server, a payment gateway server, a digital wallet server, an acquirer server, a payment network server, or an issuer server.

Merchant is an entity that offers various products and/or services in exchange of payments. The merchant may establish a merchant account with a financial institution, such as a bank (hereinafter "acquirer bank") to accept the payments from several users.

Issuer bank is a financial institution, such as a bank, where accounts of several users are established and maintained. The issuer bank ensures payment for authorized transactions in accordance with various payment network regulations and local legislation.

Payment networks are transaction card associations that act as intermediate entities between acquirer banks and issuer banks to authorize and fund transactions. Examples of various payment networks include MasterCard®, American Express®, VISA®, Discover®, Diners Club®, and the like. Payment networks settle transactions between various acquirer banks and issuer banks when transaction cards are used for initiating the transactions. The payment network ensures that a transaction card used by a user for initiating a transaction is authorized.

Transaction applications enable users to conduct transactions from an account maintained with an issuer bank. In an embodiment, a transaction application may be installed on a computing device of a user. The transaction application may be implemented by way of a code or a program stored in memory of the computing device. The transaction application presents a graphical user interface to the user for performing the transactions. In one example, a transaction application may present a catalogue including various products and/or services offered by a merchant to the user. The user may select one or more products and services from the catalogue and initiate a transaction for the selected one or more products and/or services by using the transaction application. In another embodiment, the transaction application may be a banking application that presents various transactions options, such as debit transaction, credit transaction, bill payments, fund transfer, and the like, associated with the account of the user. In an embodiment, the transactions initiated by using the transaction application are authorized based on one-time-passwords (OTPs).

Authorization includes a method of approving or declining a transaction. In one example, a banking authority responsible for authorizing transactions may not authorize a transaction when transaction amount exceeds an available balance of the account from which the transaction was initiated. In another example, the banking authority may not authorize a transaction when the user submits a wrong OTP to perform the transaction. The transaction may be initiated by using a transaction application installed on a computing device of the user.

Master authentication code is a transaction-specific code that a financial institution, such as an issuer bank, generates in response to an authorization request or a transaction request. Examples of the master authentication code include a one-time password, a QR CODE (a registered trademark of Denso Wave Incorporated, which is a type of matrix barcode), a bar code, and the like. In an embodiment, the issuer bank authorizes a transaction based on the corresponding master authentication code.

First authentication code corresponds to a partial code that includes a first portion of a master authentication code. In an embodiment, the master authentication code is split for generating the first authentication code. The first authentication code is communicated to a transaction application using which a user initiates a transaction.

Second authentication code corresponds to a partial code that includes a second portion of a master authentication code. In an embodiment, the master authentication code is split for generating the second authentication code. The second authentication code is provided to a user, who initiates a transaction, by way of registered contact information of the user.

Response code is a code generated by a transaction application by merging first and second authentication codes. The transaction application transmits the response code to an issuer server for authorizing a transaction. Examples of the response code include a QR CODE, a bar code, and the like.

Referring now to FIG. 1, a block diagram that illustrates a communication environment 100 for conducting secure transactions, in accordance with an embodiment of the present invention, is shown. The communication environment 100 includes a user 102 in possession of a user-computing device 104. The communication environment 100 further includes a merchant server 106, an acquirer server 108, a payment network server 110, and an issuer server 112. The user-computing device 104 communicates with the merchant server 106, the acquirer server 108, the payment network server 110, and the issuer server 112 by way of a communication network 114.

The user 102 may be an individual who initiates a transaction from an account. Examples of the transaction include a product or service purchase, a credit purchase, a debit transaction, a fund transfer, an online purchase, a fund withdrawal, and the like. The user 102 may be an account holder of the account. The account is maintained by a financial institution, such as an issuer bank. The issuer bank may further issue a transaction card that is linked to the account to the user 102. Examples of the transaction card include a credit card, a debit card, a membership card, a promotional card, a charge card, a prepaid card, a gift card, and the like. In one embodiment, the transaction card may be a physical card. In another embodiment, the transaction card may be a virtual card or payment token that is stored electronically in a memory (not shown) of the user-computing device 104. The transaction card includes identification information (hereinafter "account identification information") that corresponds to the account to which the transaction card is linked. The account identification information may include an account number, a unique card number, an expiry date, name of the account holder, a card security code, and the like.

The user-computing device 104 is a communication device, which belongs to the user 102. Various transaction applications, such as a transaction application 116, may be installed on the user-computing device 104. The user 102 may use the transaction application 116 to initiate various transactions from the account. In one embodiment, the user-computing device 104 may be associated with registered contact information that is linked to the account of the user 102. In one example, the registered contact information includes a registered contact number, such as a mobile telephone number, of the user 102. In another example, the registered contact information includes a registered email address of the user 102. The user 102 may have registered the contact number and the email address at the time of setting up the account with the issuer bank. Examples of the user-computing device 104 include, but are not limited to, a mobile phone, a smartphone, a personal digital assistant (PDA), a tablet, a phablet, a laptop, or any other portable communication device. In an embodiment, the user-computing device 104 may be radio frequency identification (RFID) or near field communication (NFC) enabled for contactless payments by using electronically stored account identification information of the account.

The merchant server 106 is a computing server that is associated with a merchant (not shown). The merchant may establish a merchant account with a financial institution, such as an acquirer bank, to accept the payments for products and/or services. For example, the merchant server 106 may accept the payments for products and/or services via an online payment gateway or the transaction application 116 used by the user 102 for initiating the transactions.

The acquirer server 108 is a computing server that is associated with the acquirer bank. The acquirer server 108 receives transaction details of various transactions, which the user 102 initiates, from the merchant server 106 or the transaction application 116. The transaction details of a transaction include a transaction amount, a transaction identification number, time and date of the transaction, a card type, the account identification information of the account from which the user 102 initiates the transaction, and the like. In an embodiment, the acquirer server 108 transmits an authorization request for the transaction to the payment network server 110 or the issuer server 112 associated with the account from which the transaction is initiated, via the communication network 114. The acquirer server 108 transmits the authorization request to determine whether the transaction is initiated by the account holder of the account, and whether the account holder's available credit line or account balance covers the transaction amount. In an embodiment, the acquirer server 108 credits or debits the merchant account in the acquirer bank with the transaction amount if the issuer bank approves the transaction.

The payment network server 110 is a computing server that is associated with a payment network of a transaction card. Examples of the payment networks include Master-Card, American Express, VISA, Discover, Diners Club, and the like. The payment network server 110 routes the authorization request received from the transaction application 116 or the acquirer server 108 to the issuer server 112.

The issuer server 112 is a computing server that is associated with the issuer bank. The issuer bank is a financial institution that manages accounts of multiple account holders. Account details of the accounts established with the issuer bank are stored as account profiles in a memory (not shown) or a database of the issuer server 112 or on a cloud server (not shown) associated with the issuer server 112. The account details of an account may include an account balance, credit line details, details of the account holder, transaction history of the account holder, account identification information, and the like. The details of the account holder may include name, age, gender, physical attributes, registered contact number, registered email address, and the like, of the account holder. The issuer server 112 receives various authorization requests for various transactions from one or more entities, such as the merchant server 106, the acquirer server 108, the payment network server 110, or various transaction applications installed on the user-computing device 104, over the communication network 114. Based on the authorization requests, the issuer server 112 performs authorization for the transactions and processes the transactions for approval or rejection. Methods for processing the transactions via the issuer server 112 will be apparent to persons having skill in the art and may include processing a transaction via the traditional four-party or three-party systems. The issuer server 112 debits or credits the account balance of the account holder by the transaction amount if the transaction is approved.

Examples of the merchant server 106, the acquirer server 108, the payment network server 110, and the issuer server 112 include, but are not limited to, a computer, a laptop, a mini computer, a mainframe computer, any non-transient and tangible machine that can execute a machine-readable code, or a network of computer systems.

The communication network 114 is a medium through which content and messages are transmitted between various devices, such as the user-computing device 104, the merchant server 106, the acquirer server 108, the payment network server 110, and the issuer server 112. Examples of the communication network 114 include, but are not limited to, a Wi-Fi network, a light fidelity (Li-Fi) network, a local area network (LAN), a wide area network (WAN), a metropolitan area network (MAN), a satellite network, the internet, a fiber optic network, a coaxial cable network, an infrared network, a radio frequency (RF) network, or any combination thereof. Various devices in the communication environment 100 may connect to the communication network 114 in accordance with various wired and wireless communication protocols, such as Transmission Control Protocol and Internet Protocol (TCP/IP), User Datagram Protocol (UDP), $2^{nd}$ Generation (2G), $3^{rd}$ Generation (3G), $4^{th}$ Generation (4G), long term evolution (LTE) communication protocols, or any combination thereof. The functioning of the elements of the communication environment 100 is explained in conjunction with FIG. 2.

Figure 2:
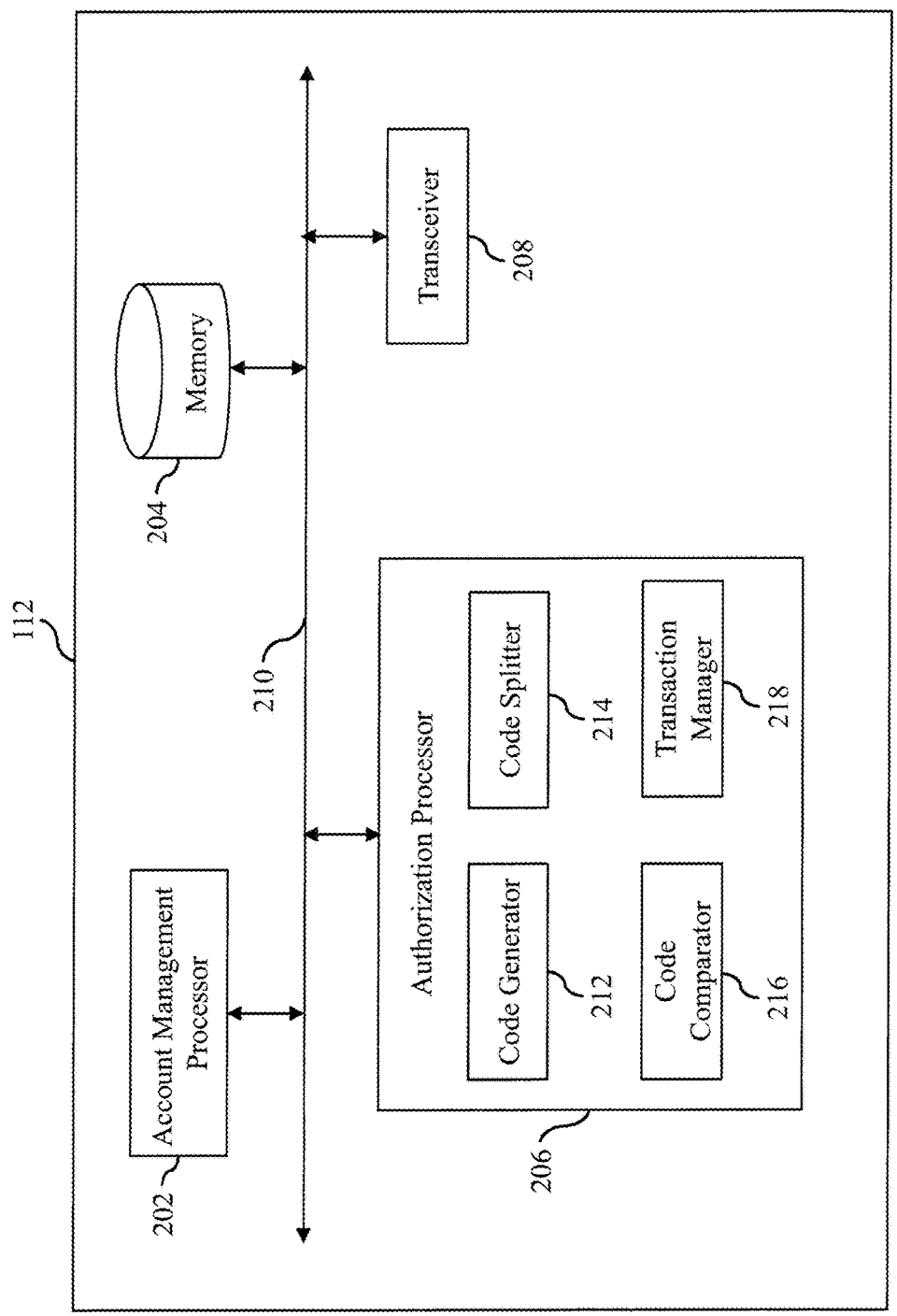
FIG. 2 is a block diagram that illustrates an issuer server of the communication environment of FIG. 1, in accordance with an embodiment of the present invention.
Figure 3C:
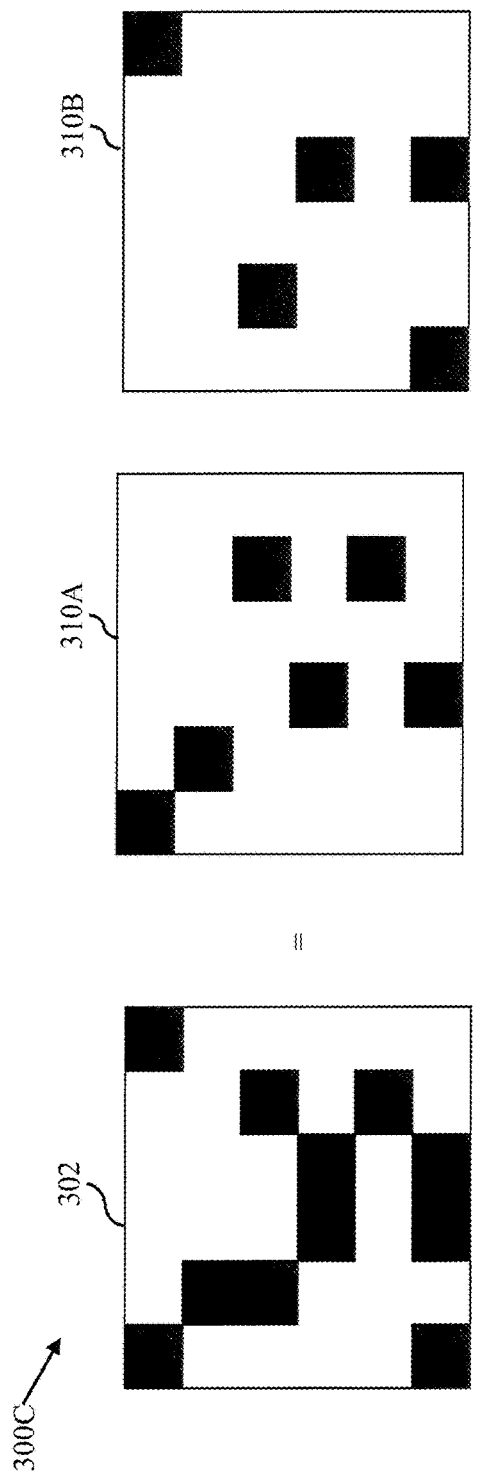
Figure 3D:
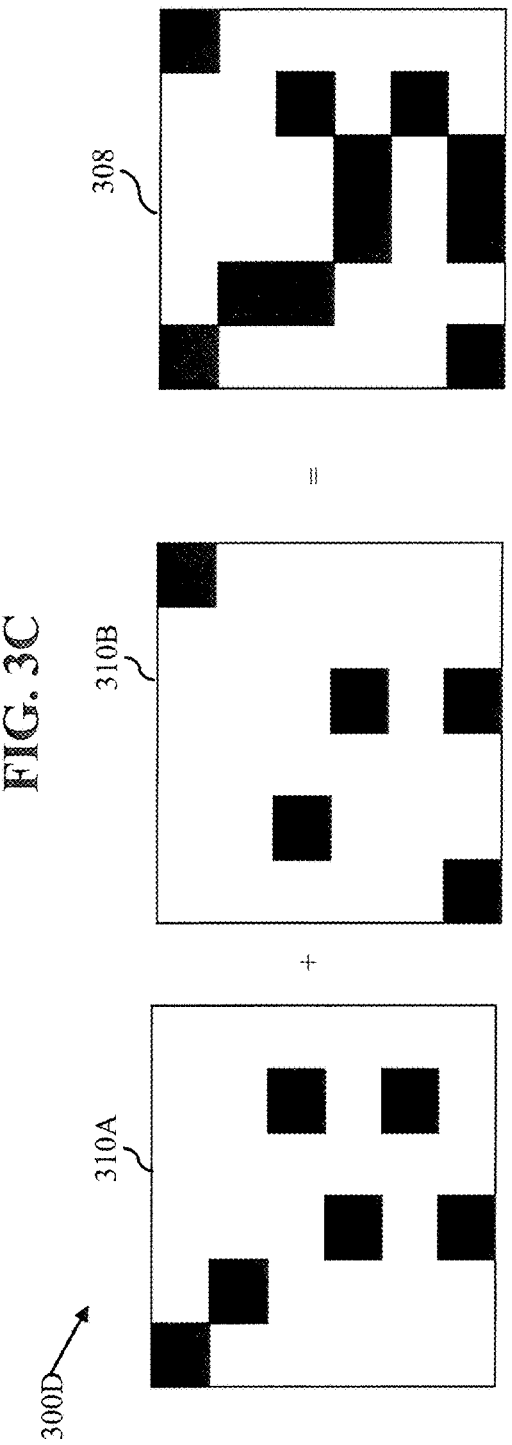
Figure 3F:
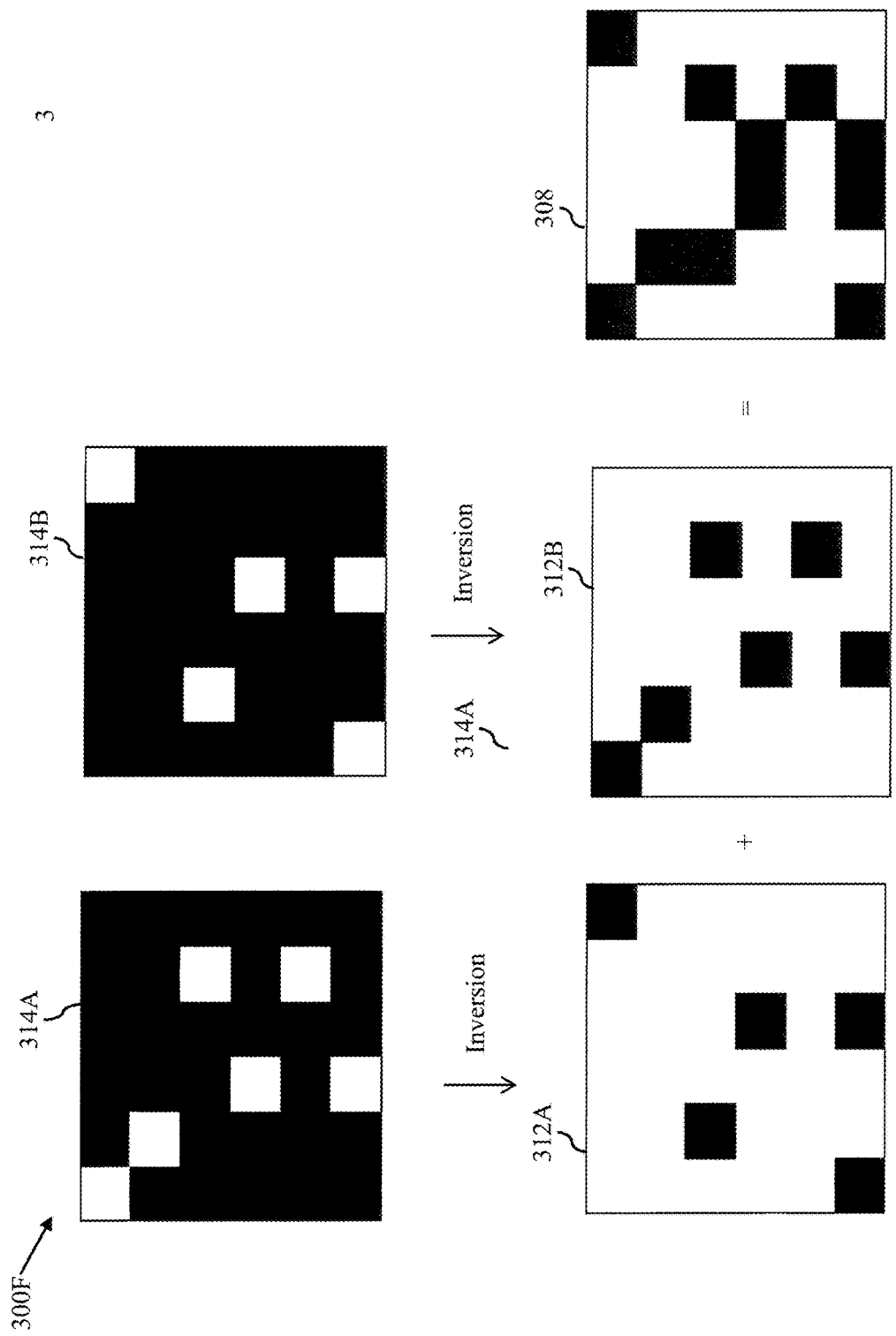

Referring now to FIG. 2, a block diagram that illustrates the issuer server 112 of the communication environment 100 of FIG. 1, in accordance with an embodiment of the present invention, is shown. The issuer server 112 includes an account management processor 202, a memory 204, an authorization processor 206, and a transceiver 208 that communicate with each other via a bus 210. The authorization processor 206 includes a code generator 212, a code splitter 214, a code comparator 216, and a transaction manager 218.

The account management processor 202 includes suitable logic, circuitry, and/or interfaces to execute instructions stored in the memory 204. The account management processor 202 also maintains the accounts of various users, such as the user 102, that are set up with the issuer bank. The account management processor 202 updates an account profile linked to each account based on transactions corresponding to each account. Examples of the account management processor 202 include an application-specific integrated circuit (ASIC) processor, a reduced instruction set computing (RISC) processor, a complex instruction set computing (CISC) processor, a field-programmable gate array (FPGA), and the like.

The memory 204 includes suitable logic, circuitry, and/or interfaces to store account profiles for the accounts that are established with the issuer bank. Each account profile includes corresponding account identification information, details of the corresponding account holder, account balance information, credit line information, details of transaction cards that are linked with the account, transaction history, and the like. The transaction history includes the transaction details of various transactions that are initiated from the corresponding account and authorization requests associated with the corresponding transactions. Examples of the memory 204 include random access memory (RAM), read-only memory (ROM), a removable storage drive, a hard disk drive (HDD), a flash memory, and the like.

The authorization processor 206 includes suitable logic, circuitry, and/or interfaces to execute operations related to transaction authorization, when an authorization request or a transaction request is received from one or more entities, such as the transaction application 116, the merchant server 106, the acquirer server 108, or the payment network server 110. Examples of the authorization processor 206 include, but are not limited to, an ASIC processor, a RISC processor, a CISC processor, an FPGA, and the like. The authorization processor 206 executes the operations related to transaction authorization by way of the code generator 212, the code splitter 214, the code comparator 216, and the transaction manager 218.

The code generator 212 includes suitable logic and/or interfaces for generating a master authentication code for each transaction based on the corresponding authorization request or the transaction request. The master authentication code is a transaction-specific code, which is valid for the corresponding transaction only. Examples of the master authentication code include a one-time password, a QR CODE, a bar code, and the like. Methods for generating the master authentication code will be apparent to persons having skill in the art.

The code splitter 214 includes suitable logic and/or interfaces for splitting the master authentication code into first and second authentication codes. The code splitter 214 splits the master authentication code associated with each transaction. It will be apparent to a person skilled in the art that the code splitter 214 may implement any technique known in the art to split the master authentication code. In various embodiments of the present invention, the techniques used for splitting the master authentication code may be randomized, i.e., for each splitting operation, the code splitter 214 may use a different splitting technique.

The code comparator 216 includes suitable logic and/or interfaces for comparing the master authentication code with a response code received from one or more entities, such as the transaction application 116, the merchant server 106, the acquirer server 108, or the payment network server 110. In one embodiment, the code comparator 216 may set or reset a comparison flag based on the result of comparison. For example, the code comparator 216 sets the comparison flag to '1', when the master authentication code matches the response code and resets the comparison flag to '0', when the master authentication code does not match the response code. It will be apparent to a person skilled in the art that the code comparator 216 may implement any technique known in the art, such as bit-wise comparison or pixel-wise comparison, to compare the master authentication code with the response code.

The transaction manager 218 includes suitable logic and/or interfaces for processing transactions. The transaction manager 218 processes the transactions based on a result of comparison between the corresponding master authentication code and the corresponding response code. In one embodiment, the transaction manager 218 processes the transactions based on a status of the comparison flag. For example, the transaction manager 218 approves a transaction when the status of the comparison flag is '1', i.e., when the response code matches the master authentication code, and declines a transaction when the status of the comparison flag is '0', i.e., when the response code does not match the master authentication code.

The transceiver 208 transmits and receives data over the communication network 114 via one or more communication network protocols. The transceiver 208 receives authorization requests for transactions from at least one of the transaction application 116, the merchant server 106, the acquirer server 108, the payment network server 110, or other entities that are pursuant to one or more standards for the interchange of transaction messages, such as the ISO 8583 standard. The transceiver 208 transmits an authorization response message for each authorization request to one or more entities such as the transaction application 116, the merchant server 106, the acquirer server 108, or the payment network server 110. The authorization response message indicates a result, such as approval or decline, of the transaction authorization performed by the authorization processor 206. Examples of the transceiver 208 include, but are not limited to, an antenna, a radio frequency transceiver, a wireless transceiver, a Bluetooth transceiver, an ethernet port, a universal serial bus (USB) port, or any other device configured to transmit and receive data.

In operation, the user 102 initiates a transaction from an account by using the transaction application 116 installed on the user-computing device 104. In one example, the user 102 may utilize the electronically stored account identification information in the user-computing device 104 to initiate the transaction through the transaction application 116. In another example, the user 102 may provide the account identification information of the account manually to the transaction application 116 through the user-computing device 104 for initiating the transaction.

In one embodiment, the transaction application 116 transmits the transaction details to the merchant server 106 and the merchant server 106 further transmits the transaction details to the acquirer server 108. In another embodiment, the transaction application 116 transmits the transaction details directly to the acquirer server 108.

The acquirer server 108 transmits an authorization request including the transaction details to the issuer server 112 through the payment network server 110, when the user 102 utilizes a transaction card linked to the account for initiating the transaction. Conversely, the acquirer server 108 directly transmits the authorization request including the transaction details to the issuer server 112, when the user 102 initiates the transaction without the use of the transaction card linked to the account. In one embodiment, the issuer server 112 may directly receive the authorization request including the transaction details from the transaction application 116.

Based on the authorization request, the code generator 212 generates a master authentication code, which is a QR CODE including a pattern of black and white pixels. The master authentication code includes version information, position information, error correction level information, redundancy information, and data encoded as the pattern of black and white pixels. The version information indicates dimensions of the master authentication code. The position information, present at corners of the master authentication code, indicates orientation and angle of viewing the master authentication code. The error correction level information indicates an error correction level of the master authentication code. The master authentication code can have any one of four error correction levels. The four error correction levels are low, medium, quartile, and high error correction levels. In one embodiment, the code generator 212 generates the master authentication code that has low error correction level. Examples of the redundancy information may include cyclic redundancy checks (CRCs), checksums, parity bits and the like. Based on the redundancy information, complete data included in the master authentication may be restored, in an event that the master authentication code is affected by noise. Alternatively stated, the redundancy information may be used to detect and correct any error introduced into the master authentication code due to affect noise or data loss during transmission.

The code generator 212 associates the master authentication code with the transaction identification number of the transaction and stores it in the memory 204.

The code splitter 214 splits the master authentication code into first and second authentication codes. In one scenario, the code splitter 214 splits the master authentication code into two partial authentication codes, i.e., the first and second authentication codes, such that a position of the black pixels in the two partial authentication codes is same as that of the master authentication code. For example, the first authentication code includes fifty percent of the black pixels of the master authentication code and the second authentication code includes the other fifty percent of the black pixels. The black pixels in the first and second authentication codes are present at the same position as in the master authentication code. In another scenario, the code splitter 214 splits the master authentication code into the first and second authentication codes, such that when a logical operation is performed between the first and the second authentication codes, the master authentication code is obtained. Examples of the logical operation include XOR operation, XNOR operation, inversion operation, and the like. Exemplary scenarios to split the master authentication code into the first and second authentication codes have been explained in conjunction with FIG. 3A, FIG. 3C, FIG. 3E, and FIG. 3G.

In one embodiment, the code splitter 214 splits the master authentication code such that the position information is retained in both the first and second authentication codes. For example, the corners of the first and second authentication codes include same position information as included in the master authentication code. Further, the first authentication code cannot be read as a standalone code (i.e., without combining it with the second authentication code), as the master authentication code has low error correction level. Similarly, the second authentication code is also not readable without the first authentication code. In one embodiment, the code splitter 214 may insert a random code in each of the first and second authentication codes. The random codes inserted in the first and second authentication codes are identical.

In another embodiment, the code splitter 214 splits the master authentication code in such a manner that the first authentication code includes a first portion of the redundancy information and the second authentication code includes a second portion of the redundancy information. For example, if seventy percent of the redundancy information is required to correct any error introduced in the master authentication code and completely restore the data, the code splitter 214 splits the master authentication code in such a manner that neither of the first and second authentication codes includes seventy percent of the redundancy information. Therefore, the first and second portions of the redundancy information included in the first and second authentication codes, respectively, are less than seventy percent of the redundancy information. Hence, the first portion of the redundancy information cannot be used to generate, complete or in parts, the second authentication code. Similarly, the second portion of the redundancy information cannot be used to generate, complete or in parts, the first authentication code.

The transceiver 208 communicates the first authentication code to the transaction application 116 using which the user 102 had initiated the transaction. The transceiver 208 further communicates the second authentication code to the user 102 by way of the registered contact information linked to the account of the user 102. In one example, the transceiver 208 transmits a message, such as a short message service (SMS) or a multimedia message service (MMS), including the second authentication code on the registered contact number of the user 102. In another example, the transceiver 208 transmits an email including the second authentication code on the registered email address of the user 102. In one embodiment, the user-computing device 104 may be associated with the registered contact number and/or the registered email address of the user 102, and therefore receives the message and/or the email. The message and/or the email including the second authentication code may be stored in a message repository (not shown) of the user-computing device 104. In another embodiment, a mobile device (not shown) possessed by the user 102 may be associated with the registered contact number and/or the registered email address of the user 102, and therefore receives the message and/or the email from the issuer server 112.

The transaction application 116 receives the first authentication code and the user 102 receives the second authentication code through at least one of the user-computing device 104 or the mobile device (not shown). In one embodiment, the user 102 submits the second authentication code to the transaction application 116. For example, the user 102 copies the second authentication code from at least one of the message or the email including second authentication code and submits it to the transaction application 116. In another embodiment, when the user-computing device 104 is associated with the registered contact number and the registered email address of the user 102, the transaction application 116 accesses the message repository of the user-computing device 104 and retrieves the second authentication code. Various ways to receive the second authentication code at the transaction application 116 are well-known in the art and their description is avoided for the sake of brevity.

The transaction application 116 generates a response code based on the first and second authentication codes. In one embodiment, the transaction application 116 identifies the random codes included in the first and second authentication codes. The transaction application 116 may reject the second authentication code if the random code included in the second authentication code is not identical to the first authentication code. The transaction application 116 further aligns the first and second authentication codes based on the corresponding position information and merges the first and second authentication codes to generate the response code. In one example, for merging the first and second authentication codes, the transaction application 116 superimposes the first authentication code on the second authentication code such that the position information of the first authentication code coincides with the position information of the second authentication code. In another example, for merging the first and second authentication codes, the transaction application 116 superimposes the second authentication code on the first authentication code such that the position information of the second authentication code coincides with the position information of the first authentication code. In yet another example, the transaction application 116 aligns the first and second authentication codes based on the corresponding position information and merges the first and second authentication codes by performing the logical operation, such as XOR operation, XNOR operation, inversion operation, and the like, between the first and the second authentication codes. Exemplary scenarios for merging the first and second authentication codes to generate the response code are explained in conjunction with FIG. 3B, FIG. 3D, FIG. 3F, and FIG. 3H. The transaction application 116 associates the response code with the transaction identification number of the transaction. The transaction application 116 further transmits the response code to the issuer server 112 via the communication network 114.

The transceiver 208 receives the response code from the transaction application 116. Based on the transaction identification number associated with the response code, the code comparator 216 retrieves the corresponding master authentication code from the memory 204. The code comparator 216 compares the response code with the master authentication code. In one embodiment, when the response code matches the master authentication code, the code comparator 216 sets the comparison flag to '1'. Conversely, when the response code does not match the master authentication code, the code comparator 216 resets the comparison flag to '0'.

In one example, when the user 102 submits a third authentication code that is different from the second authentication code to the transaction application 116 or when the transaction application 116 retrieves the third authentication code from the message repository of the user-computing device 104, the response code generated by the transaction application 116 based on the first and third authentication codes may not match the master authentication code. Hence, the code comparator 216 resets the comparison flag to '0'. In another example, when the user 102 submits the second authentication code to another transaction application that is different from the transaction application 116 or when the other transaction application retrieves the second authentication code from the message repository of the user-computing device 104, the response code generated by the other transaction application may not match the master authentication code. Thus, the code comparator 216 resets the comparison flag to '0'. In yet another example, due to noise interference during the transmission of the response code to the transceiver 208, the response code may be distorted and hence may not match the master authentication code. As a result, the code comparator 216 resets the comparison flag to '0'.

Based on the result of the comparison, the transaction manager 218 processes the transaction for approval or decline. For example, when the status of the comparison flag is '1', i.e., when the response code matches the master authentication code, the transaction manager 218 approves the transaction. Conversely, when the status of the comparison flag is '0', i.e., when the response code does not match the master authentication code, the transaction manager 218 declines the transaction.

The transaction manager 218 further transmits an authorization response message to the acquirer server 108, the merchant server 106, and the transaction application 116 for communicating a result of the transaction authorization. For example, when the transaction is approved or declined, the transaction manager 218 transmits the authorization response message to the acquirer server 108, the merchant server 106, and the transaction application 116 for communicating the approval or decline of the transaction, respectively. In an embodiment, the transaction manager 218 may further transmit a notification to the user-computing device 104 or the mobile device (not shown), associated with the registered contact information linked to the account, to instruct the user 102 to re-initiate the transaction. In an embodiment, when the transaction is approved, the account management processor 202 debits the transaction amount from the account balance of the user 102 and updates the account profile to reflect the current account balance. The acquirer server 108 credits the merchant account in the acquirer bank with the transaction amount.

Thus, the communication environment 100 provides means to conduct secure transactions. The transaction application 116 requires both the first and second authentication codes to generate a response code. Since the issuer server 112 authorizes a transaction only when the response code matches the master authentication code, any other transaction application having unauthorized access to the second authentication code cannot generate a response code that may match the master authentication code. This prevents authorization of transactions when transaction applications have unauthorized access to the second authentication code stored in the message repository of the user-computing device 104. Since the issuer server 112 generates a unique master authentication code for every transaction, the transaction application 116 cannot perform a new transaction by using a previously generated response code. Further, there is no requirement to install any additional hardware to implement the communication environment 100 and hence the transaction authorization method can be implemented on currently available infrastructure.

It will be understood by a person skilled in the art the master authentication code may be split into more than two partial codes, in which case, more than one partial code may be communicated to the user 102 and more than one partial code may be communicated to the transaction application 116 for generating the response code. For example, the code splitter 214 may split the master authentication code into three authentication codes, i.e., first through third authentication codes, and may communicate the first authentication code to the transaction application 116, and the second and third authentication codes to the registered contact number and registered email address of the user 102, respectively.

In a scenario, when the account holder and the merchant have the account and the merchant account in a same financial institution, respectively, the issuer bank and the acquirer bank are the same.

Referring now FIGS. 3A-3H, exemplary scenarios 300A-300H that illustrate splitting of the master authentication code into the first and second authentication codes, and generation of the response code based on the first and second authentication codes, in accordance with various embodiments of the present invention, are shown.

As shown in the exemplary scenario 300A, the code generator 212 generates a master authentication code 302 in response to an authorization request for a transaction initiated by the user 102 by using the transaction application 116. The code splitter 214 splits the master authentication code 302 along a dashed line 304 to generate first and second authentication codes 306A and 306B. The first authentication code 306A is communicated to the transaction application 116 and the second authentication code 306B is communicated to the user 102 by way of the registered contact information. The user 102 submits the second authentication code 306B to the transaction application 116.

As shown in the exemplary scenario 300B, the transaction application 116 appends the second authentication code 306B to right of the first authentication code 306A to generate a response code 308. The transaction application 116 then transmits the response code 308 to the issuer server 112.

As shown in the exemplary scenario 300C, the code generator 212 generates the master authentication code 302. The code splitter 214 splits the master authentication code 302 randomly into first and second authentication codes 310A and 310B. The first authentication code 310A is communicated to the transaction application 116 and the second authentication code 310B is communicated to the user 102 by way of the registered contact information. The user 102 submits the second authentication code 310B to the transaction application 116.

As shown in the exemplary scenario 300D, the transaction application 116 superimposes the second authentication code 310B on the first authentication code 310A to generate the response code 308, such that the positions of the black pixels in the first and second authentication codes 310A and 310B are retained in the response code 308. The transaction application 116 then transmits the response code 308 to the issuer server 112.

As shown in the exemplary scenario 300E, the code generator 212 generates the master authentication code 302. The code splitter 214 splits the master authentication code 302 randomly into intermediate first and second authentication codes 312A and 312B. The code generator 212 further performs an inversion operation on the intermediate first and second authentication codes 312A and 312B to generate first and second authentication codes 314A and 314B. The first authentication code 314A is communicated to the transaction application 116 and the second authentication code 314B is communicated to the user 102 by way of the registered contact information. The user 102 submits the second authentication code 314B to the transaction application 116.

As shown in the exemplary scenario 300F, the transaction application 116 performs the inversion operation on the first and second authentication codes 314A and 314B to obtain the intermediate first and second authentication codes 312A and 312B. The transaction application 116 then superimposes the intermediate second authentication code 312B on the intermediate first authentication code 312B to generate the response code 308, such that the position of the black pixels in the intermediate first and second authentication codes 312A and 312B are retained in the response code 308. The transaction application 116 then transmits the response code 308 to the issuer server 112.

As shown in the exemplary scenario 300G, the code generator 212 generates the master authentication code 302. The code splitter 214 splits the master authentication code 302 into first and second authentication codes 316A and 316B, such that when an XOR operation is performed between the first and second authentication codes 316A and 316B, the master authentication code 302 will be obtained. The first authentication code 316A is communicated to the transaction application 116 and the second authentication code 316B is communicated to the user 102 by way of the registered contact information. The user 102 submits the second authentication code 316B to the transaction application 116.

As shown in the exemplary scenario 300H, the transaction application 116 performs the XOR operation between the first and second authentication codes 316A and 316B to generate the response code 308. The transaction application 116 then transmits the response code 308 to the issuer server 112.

It will be understood by a person skilled in the art that the splitting of the master authentication code into the first and second authentication codes and the generation of the response code is not limited to the exemplary scenarios illustrated in FIGS. 3A-3H.

Figure 4:
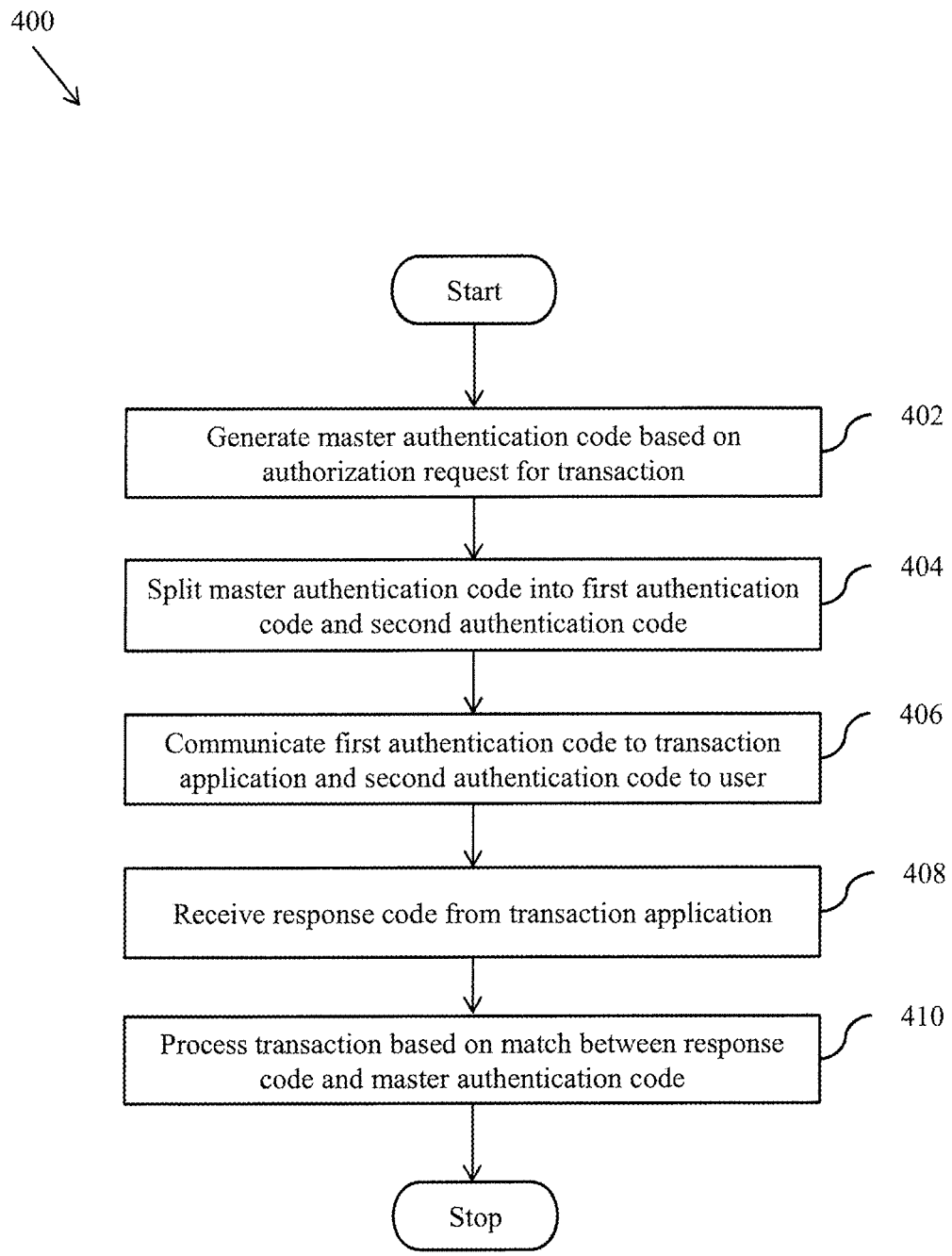
FIG. 4 represents a high-level flow chart that illustrates a method for authorizing transactions implemented using the communication environment of FIG. 1, in accordance with an embodiment of the present invention.

Referring now to FIG. 4, a high-level flow chart 400 that illustrates a method for authorizing transactions implemented using the communication environment 100 of FIG. 1, in accordance with an embodiment of the present invention, is shown. The user 102 initiates the transaction from the account by using the transaction application 116 installed on the user-computing device 104.

At step 402, the issuer server 112 generates the master authentication code based on the authorization request for the transaction. The issuer server 112 stores the master authentication code in the memory 204. At step 404, the issuer server 112 splits the master authentication code into the first and second authentication codes.

At step 406, the issuer server 112 communicates the first authentication code to the transaction application 116 and the second authentication code to the user 102 by way of the registered contact information linked to the account. At step 408, the issuer server 112 receives the response code from the transaction application 116. The transaction application 116 generates the response code based on the first and second authentication codes.

At step 410, the issuer server 112 processes the transaction based on a match between the response code and the master authentication code. The issuer server 112 may decline the transaction when there is a mismatch between the response code and the master authentication code.

Figure 5:
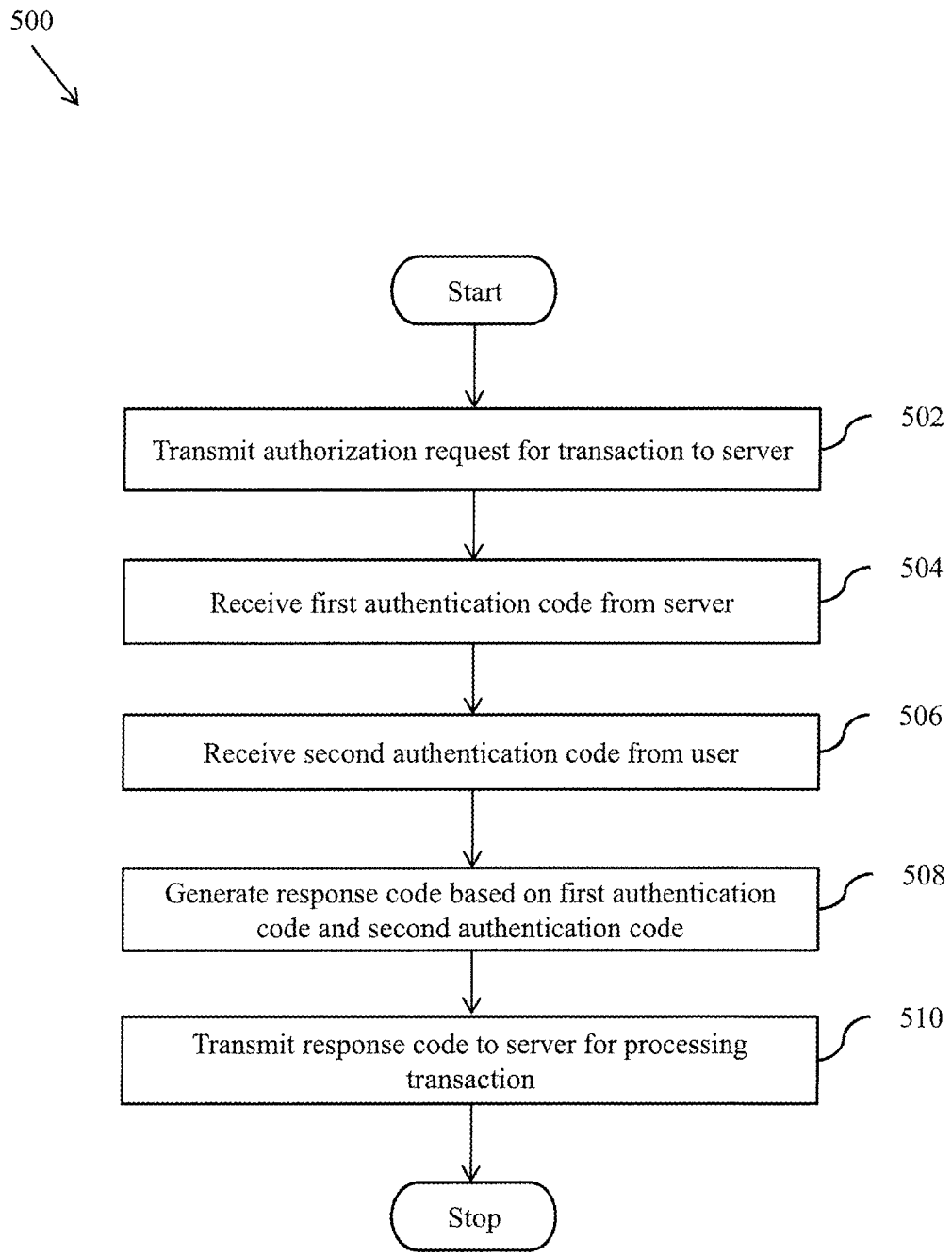
FIG. 5 represents a high-level flow chart that illustrates a method to conduct secure transactions by using a transaction application installed on a user-computing device of the communication environment of FIG. 1, in accordance with an embodiment of the present invention.

Referring now to FIG. 5, a high-level flow chart 500 that illustrates a method to conduct secure transactions by using the transaction application 116 installed on the user-computing device 104 of the communication environment 100 of FIG. 1, in accordance with an embodiment of the present invention, is shown. The user 102 initiates the transaction from the account by using the transaction application 116 installed on the user-computing device 104.

At step 502, the transaction application 116 transmits the authorization request for the transaction to the issuer server 112. The issuer server 112 generates the master authentication code based on the authorization request. The issuer server 112 further splits the master authentication code into the first and second authentication codes.

At step 504, the transaction application 116 receives the first authentication code from the issuer server 112. At step 506, the transaction application 116 receives the second authentication code from the user 102. The issuer server 112 had communicated the second authentication code to the user 102 by way of the registered contact information linked to the account.

At step 508, the transaction application 116 generates a response code based on the first and second authentication codes. At step 510, the transaction application 116 transmits the response code to the issuer server 112 for processing the transaction. The issuer server 112 processes the transaction based on a match between the response code and the master authentication code. The issuer server 112 may decline the transaction when there is a mismatch between the response code and the master authentication code.

Figure 6A:
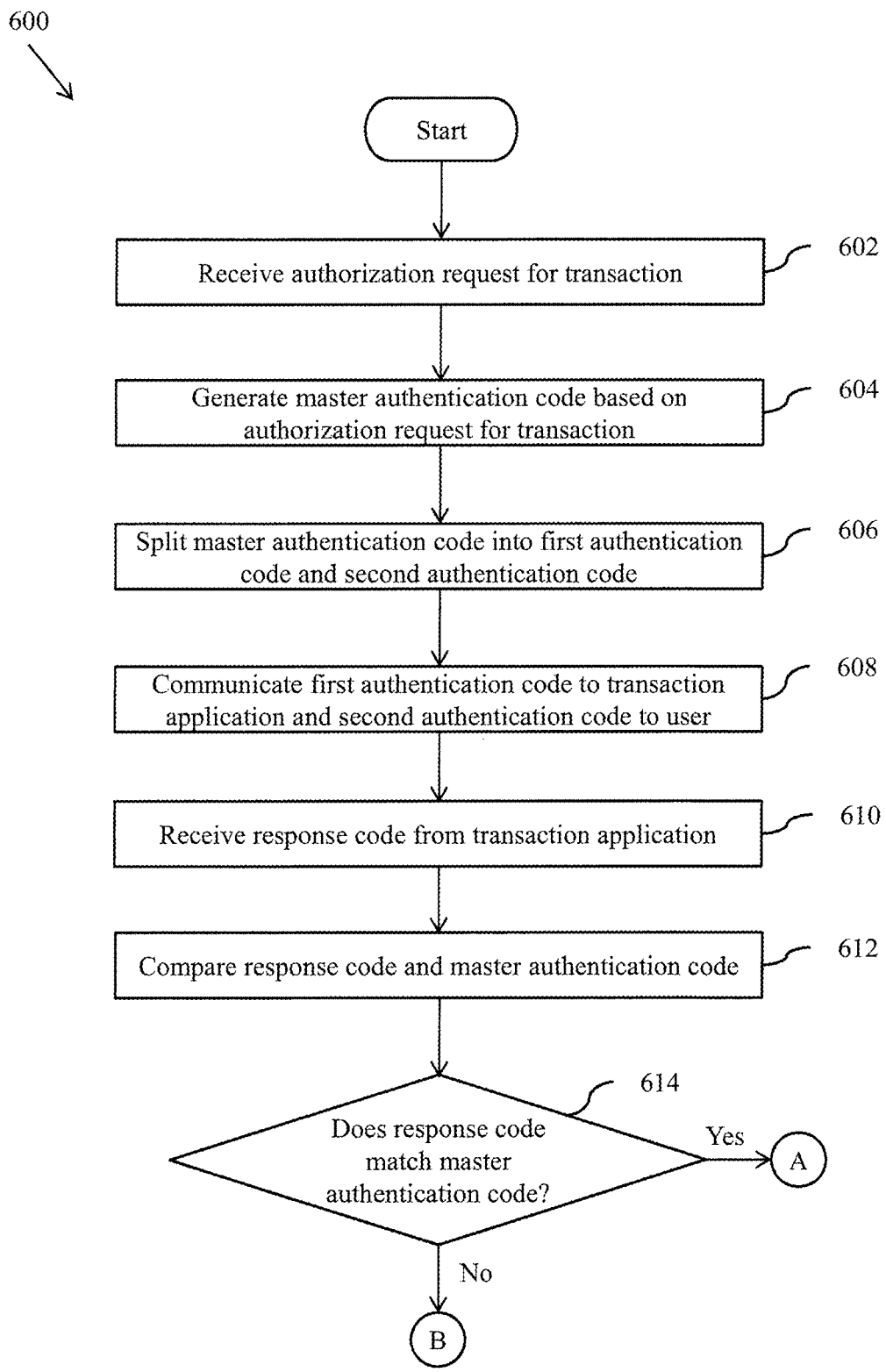
FIGS. 6A-6C collectively represent a flow chart that illustrates a method for authorizing transactions implemented using the communication environment of FIG. 1, in accordance with an embodiment of the present invention.
Figure 6B:
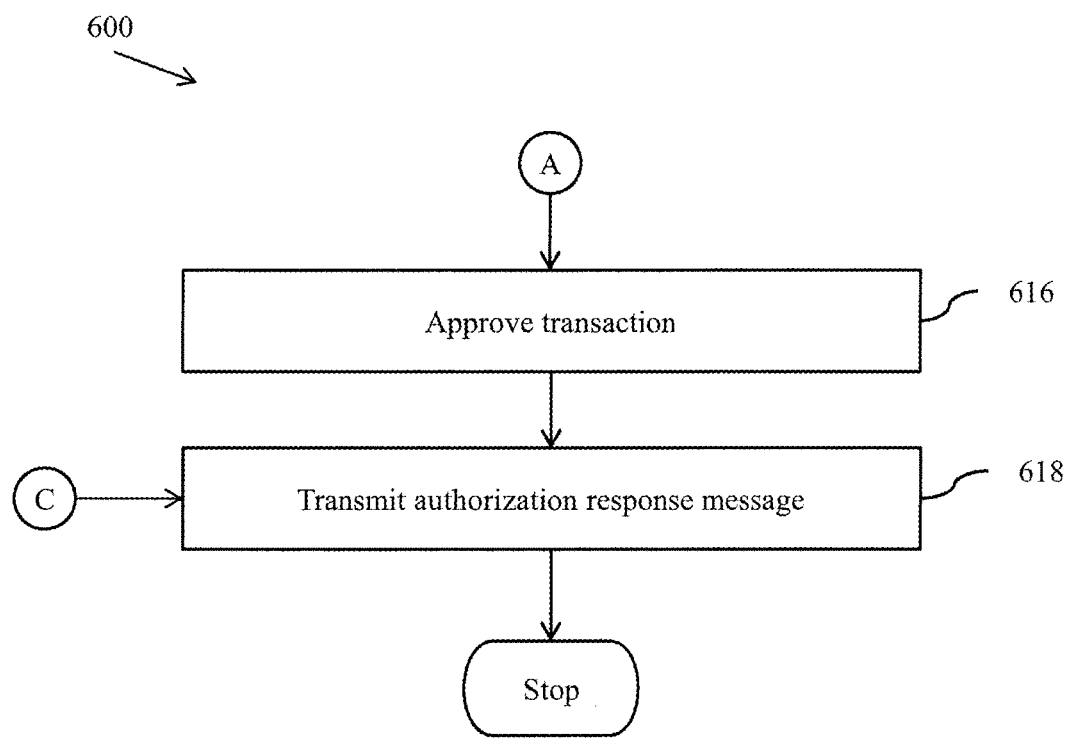
Figure 6C:
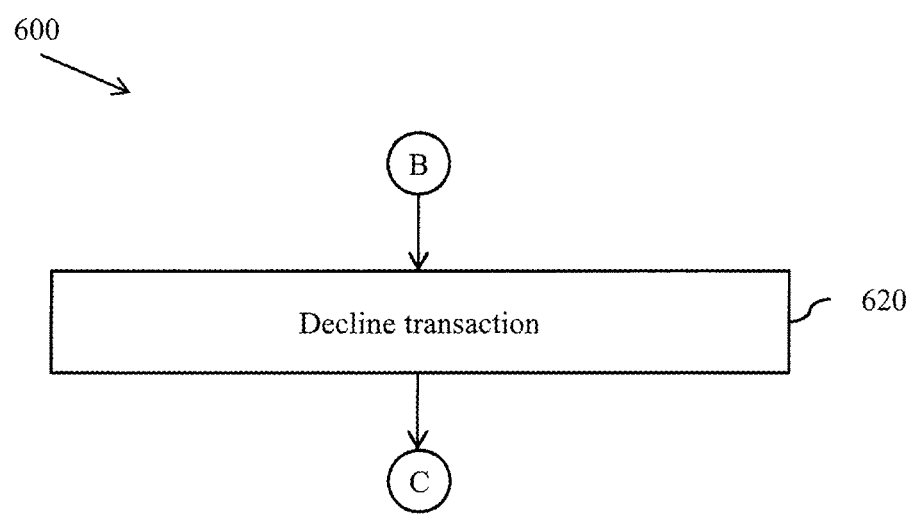

Referring now to FIGS. 6A-6C, a flow chart 600 that illustrates a method for authorizing transactions implemented using the communication environment 100 of FIG. 1, in accordance with an embodiment of the present invention, is shown. The user 102 initiates the transaction from the account by using the transaction application 116 installed on the user-computing device 104.

At step 602, the authorization processor 206 receives the authorization request for the transaction from at least one of the merchant server 106, the acquirer server 108, the payment network server 110, or the transaction application 116. The authorization request includes the transaction details of the transaction. At step 604, the authorization processor 206 generates the master authentication code based on the authorization request. The master authentication code is a QR CODE including the pattern of black and white pixels.

At step 606, the authorization processor 206 splits the master authentication code into the first and second authentication codes, as explained in conjunction with FIGS. 3A-3H. The authorization processor 206 also stores the master authentication code in the memory 204.

At step 608, the authorization processor 206 communicates the first authentication code to the transaction application 116 and the second authentication code to the user 102 by way of the registered contact information linked to the account. The user 102 submits the second authentication code to the transaction application 116, and the transaction application 116 merges the first and second authentication codes to generate the response code, as explained in conjunction with FIGS. 3A-3H.

At step 610, the authorization processor 206 receives the response code from the transaction application 116. At step 612, the authorization processor 206 compares the response code with the master authentication code stored in the memory 204. At step 614, based on the comparison, the authorization processor 206 determines whether the response code matches the master authentication code. If at step 614, it is determined that the response code matches the master authentication code, step 616 is executed.

At step 616, the authorization processor 206 approves the transaction based on the match between the response code and the master authentication code. At step 618, the authorization processor 206 transmits the authorization response message to the transaction application 116, the merchant server 106, the acquirer server 108, and/or the payment network server 110. The authorization response message indicates the result of the transaction authorization, i.e., approval or decline.

If at step 614, it is determined that the response code does not match the master authentication code, step 520 is executed. At step 620, the authorization processor 206 declines the transaction based on a mismatch between the response code and the master authentication code and executes step 618.

Figure 7:
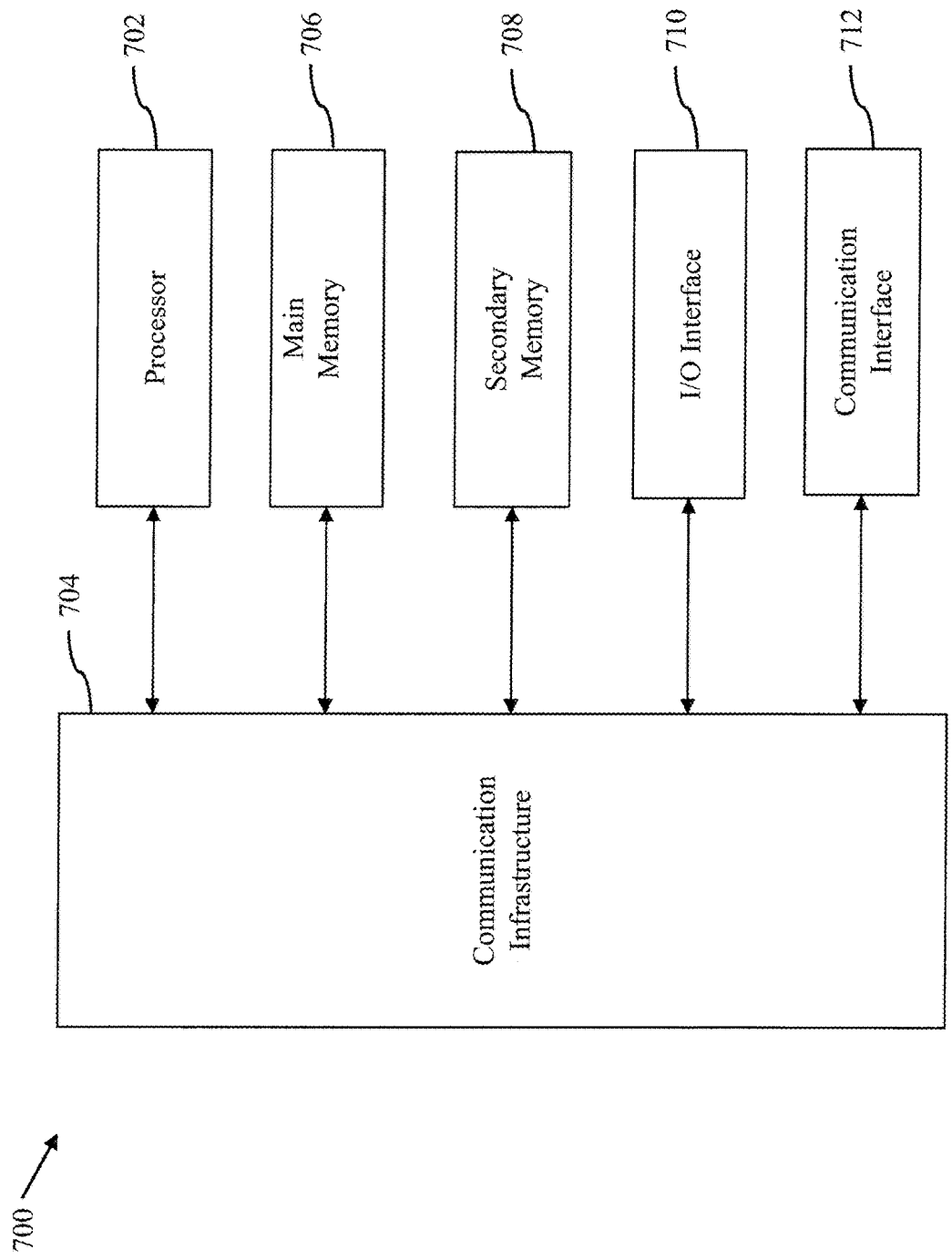
FIG. 7 is a block diagram that illustrates system architecture of a computer system, in accordance with an embodiment of the present invention.

Referring now to FIG. 7, a block diagram that illustrates system architecture of a computer system 700, in accordance with an embodiment of the present invention, is shown. An embodiment of present invention, or portions thereof, may be implemented as computer readable code on the computer system 700. In one example, the user-computing device 104, the merchant server 106, the acquirer server 108, the payment network server 110, and the issuer server 112 of FIG. 1 may be implemented in the computer system 700 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIG. 4, FIG. 5, and FIGS. 6A-6C.

The computer system 700 includes a processor 702 that may be a special purpose or a general-purpose processing device. The processor 702 may be a single processor, multiple processors, or combinations thereof. The processor 702 may have one or more processor "cores." In one example, the processor 702 is an octa-core processor. Further, the processor 702 may be connected to a communication infrastructure 704, such as a bus, message queue, the bus 210, multi-core message-passing scheme, and the like. The computer system 700 further includes a main memory 706 and a secondary memory 708. Examples of the main memory 706 may include RAM, ROM, dynamic RAM (DRAM), and the like. The secondary memory 708 may include a hard disk drive or a removable storage drive, such as a floppy disk drive, a magnetic tape drive, a compact disc, an optical disk drive, a flash memory, and the like. Further, the removable storage drive may read from and/or write to a removable storage device in a manner known in the art. In one example, if the removable storage drive is a compact disc drive, the removable storage device may be a compact disc. In an embodiment, the removable storage unit may be a non-transitory computer readable recording media.

The computer system 700 further includes an input/output (I/O) interface 710 and a communication interface 712. The I/O interface 710 includes various input and output devices that are configured to communicate with the processor 702. Examples of the input devices may include a keyboard, a mouse, a joystick, a touchscreen, a microphone, and the like. Examples, of the output devices may include a display screen, a speaker, headphones, and the like. The communication interface 712 may allow data to be transferred between the computer system 700 and various devices that are communicatively coupled to the computer system 700. Exemplary communication interfaces 712 may include a modem, a network interface, i.e., an Ethernet card, a communications port, and the like. Data transferred via the communication interface 712 corresponds to signals, such as electronic, electromagnetic, optical, or other signals as will be apparent to a person skilled in the art. The signals may travel via a communications channel (not shown) which transmits the signals to devices that are communicatively coupled to the computer system 700. Examples of the communications channel include, but are not limited to, cable, fiber optics, a phone line, a cellular phone link, or a radio frequency link.

Computer program medium and computer usable medium may refer to a non-transitory computer readable medium, such as the main memory 706 and the secondary memory 708, which may be a semiconductor memory such as a DRAM. The computer program medium may provide data that enables the computer system 700 to implement the methods illustrated in FIG. 4, FIG. 5, and FIGS. 6A-6C. In an embodiment, the present invention is implemented using a computer implemented application, the computer implemented application may be stored in a computer program product and loaded into the computer system 700 using the removable storage drive or the hard disc drive in the secondary memory 708, the I/O interface 710, or the communication interface 712.

A person having ordinary skill in the art will appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor such as the processor 702 and a memory such as the main memory 706 and the secondary memory 708 implements the above described embodiments. Further, the operations may be described as a sequential process, however some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

Techniques consistent with the present invention provide, among other features, systems and methods for authorization of transactions. While various exemplary embodiments of the disclosed system and method have been described above it should be understood that they have been presented for purposes of example only, not limitations. It is not exhaustive and does not limit the invention to the precise form disclosed.

In the claims, the words 'comprising', 'including' and 'having' do not exclude the presence of other elements or steps then those listed in a claim. The terms "a" or "an," as used herein, are defined as one or more than one. Unless stated otherwise, terms such as "first" and "second" are used to arbitrarily distinguish between the elements such terms describe. Thus, these terms are not necessarily intended to indicate temporal or other prioritization of such elements. The fact that certain measures are recited in mutually different claims does not indicate that a combination of these measures cannot be used to advantage.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

What is claimed is:

1. A transaction authorization method, comprising:
   generating, by a server, a master authentication code based on an authorization request for a transaction, wherein a user initiates the transaction from an account by using a transaction application of a plurality of transaction applications installed on a user-computing device;
   splitting, by the server, the master authentication code into a first authentication code and a second authentication code, such that when a logical operation is performed between the first authentication code and the second authentication code, the master authentication code is obtained, the logical operation being an XOR operation, an XNOR operation, or an inversion operation;
   communicating, by the server, the first authentication code to the transaction application and the second authentication code to the user by way of registered contact information linked to the account, wherein the second authentication code is accessible to another transaction application of the plurality of transaction applications at the user-computing device;
   receiving, by the server, a response code from a corresponding at least one of the plurality of transaction applications, the at least one of the plurality of transaction applications comprising the transaction application, wherein the transaction application generates the response code based on the first authentication code and the second authentication code;
   determining, by the server, whether the master authentication code itself matches the response code generated by and received from the transaction application; and
   processing, by the server, the transaction based on a match between the response code and the master authentication code.

2. The transaction authorization method of claim 1, further comprising receiving, by the server, the authorization request from the transaction application installed on the user-computing device.

3. The transaction authorization method of claim 1, wherein the master authentication code is a Quick Response code (QR CODE), and wherein the first authentication code is a first portion of the QR CODE and the second authentication code is a second portion of the QR CODE.

4. The transaction authorization method of claim 1, wherein the registered contact information includes at least one of a registered contact number or a registered email address of the user.

5. The transaction authorization method of claim 1, wherein the user submits the second authentication code to the transaction application.

6. The transaction authorization method of claim 1, wherein the transaction application retrieves the second authentication code by accessing a message repository of the user-computing device.

7. The transaction authorization method of claim 1, wherein at least one of the first authentication code or the second authentication code includes position information, and wherein the transaction application generates the response code by merging the first authentication code and the second authentication code based on the position information.

8. The transaction authorization method of claim 1, wherein determining whether the master authentication code itself matches the response code comprises comparing, by the server, the response code with the master authentication code for processing the transaction.

9. The transaction authorization method of claim 1, further comprising declining, by the server, the transaction based on a mismatch between the response code and the master authentication code.

10. A transaction authorization system, comprising:
    a server comprising:
    a memory configured to store a plurality of authorization requests for a plurality of transactions; and
    a processor that communicates with the memory, wherein the processor is configured to:
    generate a master authentication code based on an authorization request for a transaction of the plurality of transactions, wherein a user initiates the transaction from an account by using a transaction application of a plurality of transaction applications installed on a user-computing device;
    split the master authentication code into a first authentication code and a second authentication code, such that when a logical operation is performed between the first authentication code and the second authentication code, the master authentication code is obtained, the logical operation being an XOR operation, an XNOR operation, or an inversion operation;
    communicate the first authentication code to the transaction application and the second authentication code to the user by way of registered contact information linked to the account, wherein the second authentication code is accessible to another transaction application of the plurality of transaction applications at the user-computing device;
    receive a response code from a corresponding at least one of the plurality of transaction applications, the at least one of the plurality of transaction applications comprising the transaction application, wherein the transaction application generates the response code based on the first authentication code and the second authentication code;
    determine whether the master authentication code itself matches the response code generated by and received from the transaction application; and process the transaction based on a match between the response code and the master authentication code.

11. The transaction authorization system of claim 10, wherein the processor is further configured to receive the authorization request from the transaction application installed on the user-computing device.

12. The transaction authorization system of claim 10, wherein the master authentication code is a Quick Response code (QR CODE), and wherein the first authentication code is a first portion of the QR CODE and the second authentication code is a second portion of the QR CODE.

13. The transaction authorization system of claim 10, wherein the registered contact information includes at least one of a registered contact number or a registered email address of the user.

14. The transaction authorization system of claim 10, wherein the user submits the second authentication code to the transaction application.

15. The transaction authorization system of claim 10, wherein the transaction application retrieves the second authentication code by accessing a message repository of the user-computing device.

16. The transaction authorization system of claim 10, wherein at least one of the first authentication code or the second authentication code includes position information, and wherein the transaction application generates the response code by merging the first authentication code and the second authentication code based on the position information.

17. The transaction authorization system of claim 10, wherein the processor is further configured to compare the response code with the master authentication code for processing the transaction.

18. The transaction authorization system of claim 10, wherein the processor is further configured to decline the transaction based on a mismatch between the response code and the master authentication code.

19. A method for conducting transactions, the method comprising:

transmitting, by a transaction application of a plurality of transaction applications installed on a user-computing device, an authorization request for a transaction to a server, wherein a user initiates the transaction from an account by using the transaction application, and wherein the server generates a master authentication code based on the authorization request;

receiving, by the transaction application, a first authentication code from the server, wherein the server splits the master authentication code into the first authentication code and a second authentication code, such that when a logical operation is performed between the first authentication code and the second authentication code, the master authentication code is obtained, the logical operation being an XOR operation, an XNOR operation, or an inversion operation;

receiving, by the transaction application, the second authentication code from the user, wherein the server communicates the second authentication code to the user by way of registered contact information linked to the account, wherein the second authentication code is accessible to another transaction application of the plurality of transaction applications at the user-computing device;

generating, by the transaction application, a response code based on the first authentication code and the second authentication code, wherein any other transaction application of the plurality of transaction applications that has unauthorized access to the second authentication code cannot generate a response code that matches the master authentication code without receiving the first authentication code from the server; and transmitting, by the transaction application, the response code to the server for processing the transaction including whether the master authentication code itself matches the response code, wherein the server processes the transaction based on a match between the response code and the master authentication code.

\* \* \* \* \*